(12) United States Patent
Kersey (10) Patent No.: US 10,031,009 B2
(45) Date of Patent: Jul. 24, 2018

(54) FLOW PROFILING TECHNIQUES BASED ON MODULATED MAGNETIC-ELECTRICAL IMPEDANCE TOMOGRAPHY

(71) Applicant: CiDRA Corporate Services Inc., Wallingford, CT (US)

(72) Inventor: Alan D. Kersey, South Glastonbury, CT (US)

(73) Assignee: CiDRA CORPORATE SERVICES, INC., Wallingford, CT (US)

( * ) Notice: Subject to any disclaimer, the term of this patent is extended or adjusted under 35 U.S.C. 154(b) by 705 days.

(21) Appl. No.: 14/421,668

(22) PCT Filed: Aug. 13, 2013

(86) PCT No.: PCT/US2013/054674
§ 371 (c)(1),
(2) Date: Feb. 13, 2015

(87) PCT Pub. No.: WO2014/028450
PCT Pub. Date: Feb. 20, 2014

(65) Prior Publication Data
US 2015/0219481 A1   Aug. 6, 2015

Related U.S. Application Data

(60) Provisional application No. 61/682,979, filed on Aug. 14, 2012.

(51) Int. Cl.
*G01F 1/00* (2006.01)
*G01F 1/58* (2006.01)

(52) U.S. Cl.
CPC .............. *G01F 1/586* (2013.01); *G01F 1/584* (2013.01); *G01F 1/588* (2013.01)

(58) Field of Classification Search
CPC ...... G01F 1/586; G01F 15/022; G01F 15/063; G01F 25/0007; G01F 1/66
USPC ............................................. 702/33, 45–47
See application file for complete search history.

(56) References Cited

U.S. PATENT DOCUMENTS

| | | |
|---|---|---|
| 4,328,707 A | 5/1982 | Clement et al. |
| 4,386,854 A | 6/1983 | Byer |
| 5,003,517 A | 3/1991 | Greer, Jr. |
| 5,181,778 A | 1/1993 | Beller |
| 6,078,397 A | 6/2000 | Monchalin et al. |
| 6,310,406 B1 | 10/2001 | Van Berkel |
| 6,397,095 B1 | 5/2002 | Eyuboglu et al. |

*Primary Examiner* — An Do
(74) *Attorney, Agent, or Firm* — Ware, Fressola, Maguire & Barber LLP

(57) ABSTRACT

Apparatus includes a signal processing module configured at least to: receive signaling containing information about an application of a rotating magnetic field across a fluid flowing in a pipe, tank, cell or vessel; and determine a flow analysis across the fluid flowing in the pipe, tank, cell or vessel, based at least partly on the signaling received. The signal processing module may also be configured to provide corresponding signaling containing information about the flow analysis across the fluid flowing in the pipe, tank, cell or vessel.

32 Claims, 6 Drawing Sheets

Rotating Field Magmeter

Rotating Field Tomographic Magmeter

Figure 1a: Magnetic Flowmeter Principle (MagMeter) (Prior Art)

Figure 1b: Multi-Electrode Magmeter (Prior Art)

Apparatus 10 a signal processor or processing module 10a configured at least to:

receive signaling containing information about an application of a rotating magnetic field across a fluid flowing in a pipe; and determine a flow analysis across the fluid flowing in the pipe, based at least partly on the signaling received; and/or provide corresponding signaling containing information about the flow analysis determined across the fluid flowing in the pipe, including where this corresponding signaling may be used by another device, e.g., for displaying, printing out, or further processing the flow analysis determined.

One or more other module/components 10b, including input/output components/modules, memory (RAM, ROM, etc.), data, control and address busing architecture, etc.

Figure 2

Figure 3a: Multi Axis Magmeter

Figure 3b: Multi Axis Magmeter

Figure 3c: Rotating Field Magmeter

Figure 3d: Rotating Field Tomographic Magmeter

Figure 4a

Diametrically opposed pairs

Figure 4b

Vertical Planes

FLOW PROFILING TECHNIQUES BASED ON MODULATED MAGNETIC-ELECTRICAL IMPEDANCE TOMOGRAPHY

CROSS-REFERENCE TO RELATED APPLICATIONS

This application corresponds to international patent application serial no. PCT/US2013/054674, filed 13 Aug. 2013, which claims benefit to provisional patent application Ser. No. 61/682,979, filed 14 Aug. 2012, which is incorporated by reference in their entirety.

This application is related to PCT/US13/46738, filed 20 Jun. 2013, which claims benefit to provisional patent application Ser. No. 61/662,094, filed 20 Jun. 2012, which are incorporated by reference in their entirety.

This application is related to PCT/US13/28285, filed 28 Feb. 2013, which claims benefit to provisional patent application Ser. No. 61/604,080, filed 28 Feb. 2012, which are incorporated by reference in their entirety.

This application is also related to PCT application no. PCT/US12/60811, filed 18 Oct. 2012, which claims benefit to provisional patent application Ser. No. 61/548,513, filed 18 Oct. 2011, which are incorporated by reference in their entirety.

This application is also related to PCT application no. PCT/US12/52074, filed 23 Aug. 2012, which claims benefit to provisional patent application Ser. No. 61/526,336, filed 23 Aug. 2011, which are incorporated by reference in their entirety.

BACKGROUND OF THE INVENTION

1. Field of Invention

The present invention relates to techniques for determining a flow analysis of a fluid flowing in a pipe, tank, vessel or container; and more particularly to techniques for determining a flow analysis of a fluid flowing in a pipe, tank, vessel or container using tomographic techniques.

2. Description of Related Art

Figure 1A:
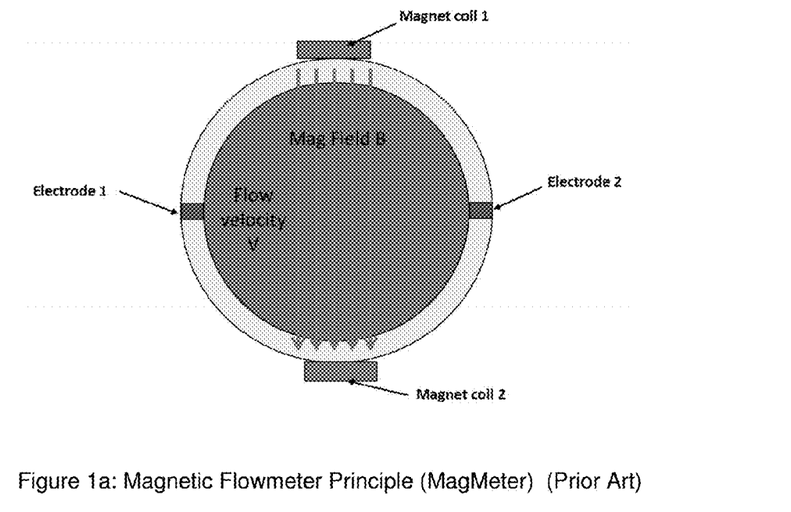
FIG. 1a shows a process flow pipe having a magnetic flowmeter arranged thereon with two diametrically opposed magnet coils and two diametrically opposed electrodes that is known in the art.

Magnetic flow meters are known in the art. By way of example, FIG. 1a shows a process flow pipe having such a magnetic flowmeter arranged thereon with two diametrically opposed magnet coils and two diametrically opposed electrodes. Consistent with that shown in FIG. 1a, the application of a magnetic field, B, to a conducting, flowing fluid creates a potential across the flow, perpendicular to the field vector B (Faraday's Law), which is the standard operating principle of a magmeter. Electrodes to monitor the potential are normally placed at diametrically opposing points across the flow stream, orthogonal to the magnetic field direction.

Figure 1B:
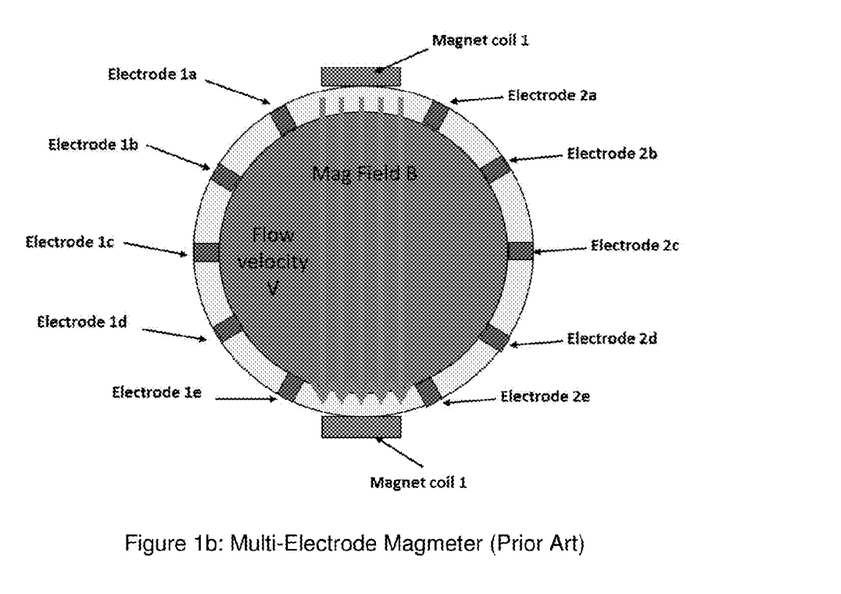
FIG. 1b shows a process flow pipe having a magnetic flowmeter arranged thereon with two diametrically opposed magnet coils and multiple pairs of diametrically opposed electrodes that is known in the art.

Alternatively, FIG. 1b shows a process flow pipe having a magnetic flowmeter arranged thereon with two diametrically opposed magnet coils and multiple pairs of diametrically opposed electrodes. Consistent with that shown in FIG. 1b, placing multiple electrodes around the pipe allows the flow to be measured in different 'planes' within the flow, which provides an ability to segment the flow and provide flow profiling across the flow stream. Voltage developed across electrodes (1a, 1b, 1c, 1d, 1e and 2a, 2b, 2c, 2d, 2e) is proportional to the magnetic field strength (B) and the flow velocity V in the "a-a plane", "b-b plane", "c-c plane", "d-d plane" and "e-e plane" of the flowmeter. This multi-electrode magmeter approach provides an ability to 'profile' the flow rate (e.g., 5 planes in as shown).

In view of the aforementioned understanding, there is a need in the industry for a different and better way to determine a flow analysis of a fluid flowing, e.g., in a pipe, tank, cell or vessel.

SUMMARY OF THE INVENTION

In summary, and according to some embodiments of the present invention, a technique is provided by placing two pairs of magnetic field generating coils in orthogonal directions, so a magnetic field can be steered or swept continuously.

Combined with the multi-electrodes, this allows profiling of the flow in multiple orientations; and Deconvolution of this data using tomographic processing algorithms provides a detailed analysis of the flow profile in the full X-Y (Horz-Vert) planes.

Examples of Particular Embodiments

According to some embodiments, the present invention may include, or take the form of, apparatus featuring a signal processor or processing module configured at least to:

receive signaling containing information about an application of a rotating magnetic field across a fluid flowing in a pipe, tank, cell or vessel; and determine a flow analysis across the fluid flowing in the pipe, tank, cell or vessel, based at least partly on the signaling received.

According to some embodiments of the present invention, the signal processing module may also be configured to provide corresponding signaling containing information about the flow analysis across the fluid flowing in the pipe, tank, cell or vessel; and this signaling may be used by another device, e.g., for displaying, printing out, or further processing the flow analysis determined.

The present invention may also include one or more of the following features alone or in combination, as follows:

The application of the rotating magnetic field across the fluid flowing in the pipe may be generated by orthogonal magnetic coil pairs configured in relation to the pipe, so as to allow an effective magnetic vector to be steered or swept continuously.

The orthogonal magnetic coil pairs may respond to quadrature drive currents that allow for the generation of the rotating magnetic field.

The rotating magnetic field may have a substantially constant strength and rotational speed ($\omega$).

The signal processing module may be configured to receive the signaling from multiple electrode pairs configured in relation to the pipe, e.g., so as to allow profiling of the fluid flowing in the pipe in multiple orientations.

The rotating magnetic field may also produce electrical potential across the multiple electrode pairs, including every pair of the multiple electrode pairs.

Each electrode pair may also sample a rate of the fluid flowing in the pipe for a respective plane.

The multiple electrode pairs may include corresponding electrode pairs that are diametrically opposed, or that are in vertical planes, or that are in horizontal planes, or that are diametrically offset, so as to allow the fluid flowing in the pipe to be measured in different planes.

The flow analysis determined may also include either a segment of the fluid flowing in the pipe, or a flow profiling across the fluid flowing in the pipe.

The signal processing module may also be configured to determine the flow analysis based at least partly on using a deconvolution of data received in the signaling using one or more tomographic processing algorithms, e.g., including modulated magnetic-electrical impedance tomography, and determine a detailed analysis of a flow profile in full X-Y planes.

The apparatus may comprise orthogonal magnetic coil pairs configured in relation to the pipe to provide the application of the rotating magnetic field across the fluid flowing in the pipe, so as to allow an effective magnetic vector to be steered.

Each electrode pair may also be configured to sample a rate of the fluid flowing in the pipe for a respective plane.

The multiple electrode pairs may comprise corresponding electrode pairs that are diametrically opposed, or that are in vertical planes, or that are in horizontal planes, or that are diametrically offset, so as to allow the fluid flowing in the pipe to be measured in different planes.

The signal processing module may also be configured with at least one processor and at least one memory including computer program code, the at least one memory and computer program code configured, with the at least one processor. The signal processing module may also be configured to determine the flow analysis across the fluid flowing in the pipe, based at least partly on using tomography, including using a method or technique of producing a three-dimensional image of the fluid flowing in the pipe by sensing and recording differences in the effects on the passage of waves of energy impinging on the fluid flowing in the pipe.

The Method

According to some embodiments, the present invention may include, or take the form of, a method or process that includes steps for receiving in a signal processing module signaling containing information about an application of a rotating magnetic field across a fluid flowing in a pipe; and determining in the signal processing module a flow analysis across the fluid flowing in the pipe, based at least partly on the signaling received.

According to some embodiments of the present invention, the method may also include providing corresponding signaling containing information about the flow analysis across the fluid flowing in the pipe.

The method may also include one or more of the features set forth herein, according to some embodiments of the present invention.

Means-Plus-Function Apparatus

According to some embodiment, the present invention may include, or take the form of: apparatus comprising a signal processing module that may be configured at least with:
  means for receiving signaling containing information about an application of a rotating magnetic field across a fluid flowing in a pipe, tank, cell or vessel; and
  means for determining a flow analysis across the fluid flowing in the pipe, tank, cell or vessel, based at least partly on the signaling received.

The signal processing module may also be configured at least with means for providing corresponding signaling containing information about the flow analysis across the fluid flowing in the pipe.

BRIEF DESCRIPTION OF THE DRAWING

The drawing includes FIGS. 1-4d, which are not necessarily drawn to scale, as follows.

DETAILED DESCRIPTION OF BEST MODE OF THE INVENTION

Figure 2:
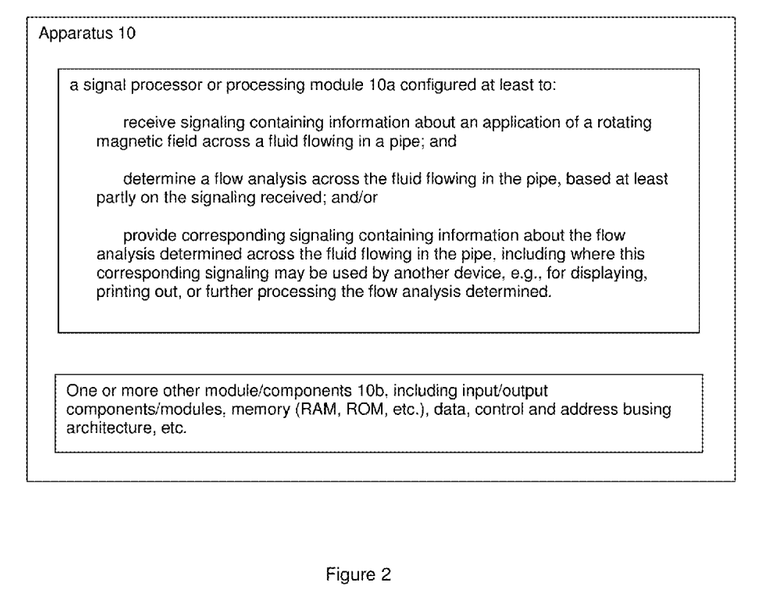
FIG. 2 is a block diagram of apparatus having a signal processor or processing module configured to implement some embodiments of the present invention.

FIG. 2: The Basic Apparatus 10

By way of example, FIG. 2 shows apparatus 10 having a signal processor or processing module 10a for implementing the basic signal processing functionality according to some embodiments of the present invention. The signal processor or processing module 10a may be configured at least to:

receive signaling containing information about an application of a rotating magnetic field across a fluid flowing in a pipe; and determine a flow analysis across the fluid flowing in the pipe, based at least partly on the signaling received.

The signal processor or processing module 10a may also be configured to provide corresponding signaling containing corresponding information about the flow analysis across the fluid flowing in the pipe; and this signaling may be used by another device, e.g., for displaying, printing out, or further processing the flow analysis determined. The scope of the invention is not intended to be limited to the type or kind of use of the corresponding signaling containing information about the flow analysis of the fluid flowing in the pipe, including types or kinds of uses either now known or later developed in the future.

Further, the scope of the invention is not intended to be limited to the type or kind of container, piping or apparatus in which the fluid may be placed or flowing. For example, the scope of the invention is intended to include, and embodiments are envisioned in which, the signaling received contains information about an application of a rotating magnetic field across a fluid placed, contained or flowing in a pipe, tank, cell or vessel.

Furthermore, the scope of the invention is not intended to be limited to the type or kind of fluid contained, processed or flowing in the pipe. For example, the scope of the invention is intended to include processing fluids that are either now known or later developed in the future. Moreover still, the scope of the invention is not intended to be limited to the type or kind of industrial process of which the fluid is being processed, including a process or processes that is or are either now known or later developed in the future.

Furthermore still, the apparatus 10 may also include other circuits, components or modules 10b to implement the functionality of the signal processor or processing module 10a either now known or later developed in the future, e.g., including memory modules, input/output modules, data and busing architecture and other signal processing circuits, wiring or components, consistent with that known by a person skilled in the art, and/or consistent with that set forth herein.

Figure 3A:
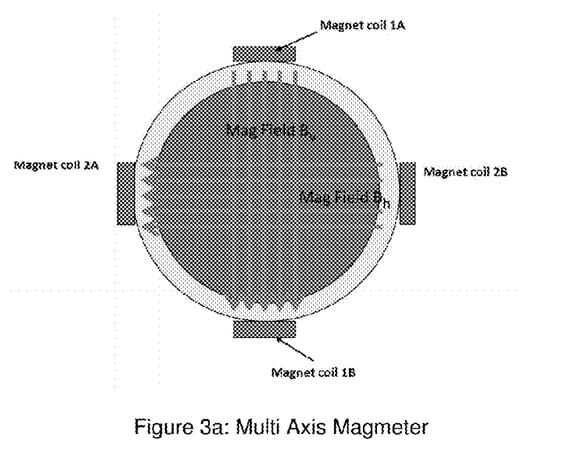
FIG. 3a shows a process flow pipe having a multi-axis magmeter arranged thereon with two pairs of diametrically opposed magnet coils for providing orthogonal magnetic fields $B_v$, $B_h$, that may form part of some embodiments of the present invention.
Figure 3B:
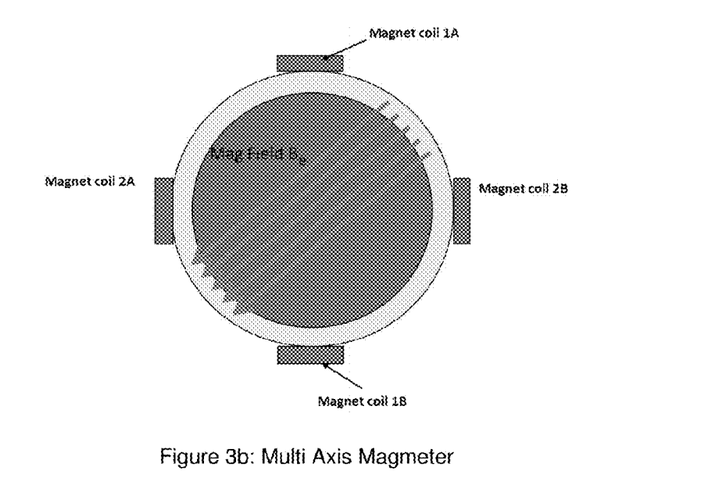
FIG. 3b shows a process flow pipe having a multi-axis magmeter arranged thereon with two pairs of diametrically opposed magnet coils, consistent with that shown in FIG. 3a, for responding to an application of quadrature drive currents, and providing a rotating magnetic field $B_e$, (where $B_e=B_v+B_h$), that may form part of some embodiments of the present invention.
Figure 3C:
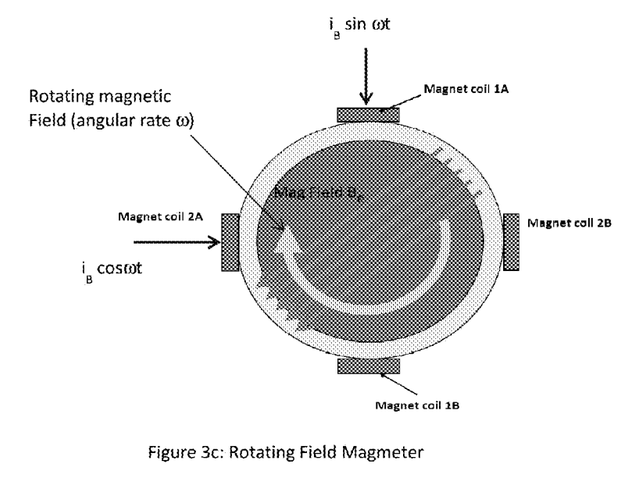
FIG. 3c shows a process flow pipe having a rotating field magmeter with two pairs of diametrically opposed magnet coils, consistent with that shown in FIGS. 3a and 3b, for responding to an application of quadrature drive currents ($i_h \sin(\omega t)$, $i_h \cos(\omega t)$), and providing a rotating magnetic field $B_e$ (where $B_e=B_v+B_h$) with an angular rate of $\omega$, according to some embodiments of the present invention.

FIGS. 3a to 3c: The Multi-Axis Magmeter

By way of example, FIGS. 3a to 3c show an implementation of an embodiment for generating a rotating magnetic field in a multi-axis magmeter, according to some embodiments of the present invention.

For example, FIG. 3a shows a process flow pipe P having the multi-axis magmeter arranged thereon with two pairs of diametrically opposed magnet coils, including magnet coils labeled 1A, 1B, 2A and 2B, configured for providing orthogonal magnetic fields $B_v$, $B_h$, that may form part of some embodiments of the present invention.

FIG. 3b shows the process flow pipe P having the multi-axis magmeter arranged thereon with the two pairs of diametrically opposed magnet coils labeled 1A, 1B, 2A and 2B, consistent with that shown in FIG. 3a, configured for responding to an application of quadrature drive currents, and providing a rotating magnetic field $B_e$ (where $B_e = B_v + B_h$), that may form part of some embodiments of the present invention.

FIG. 3c shows the process flow pipe P having the rotating field magmeter with the two pairs of diametrically opposed magnet coils labeled 1A, 1B, 2A and 2B, consistent with that shown in FIGS. 3a and 3b, configured for responding to the application of quadrature drive currents (e.g., labeled $i_b \sin(\omega t)$, $i_b \cos(\omega t)$), as shown, and providing the rotating magnetic field $B_e$ (where $B_e = B_v + B_h$) with an angular rate of $\omega$, according to some embodiments of the present invention. The arrow labeled A indicates the direction of rotation of the magnetic field, which is shown by way of example, as being clockwise. In effect, the application of magnetic fields via the orthogonal coil pairs allows the effective magnetic vector to be rotationally steered, based at least partly on the vector summation: $B_e = B_h + B_v$.

By way of example, the application of the quadrature drive currents (e.g., using sine and cosine functionality) to the magnetic coils labeled 1A, 1B, 2A and 2B allows for the generation of the rotating magnetic field $B_e$, according to some embodiments of the present invention.

Figure 3D:
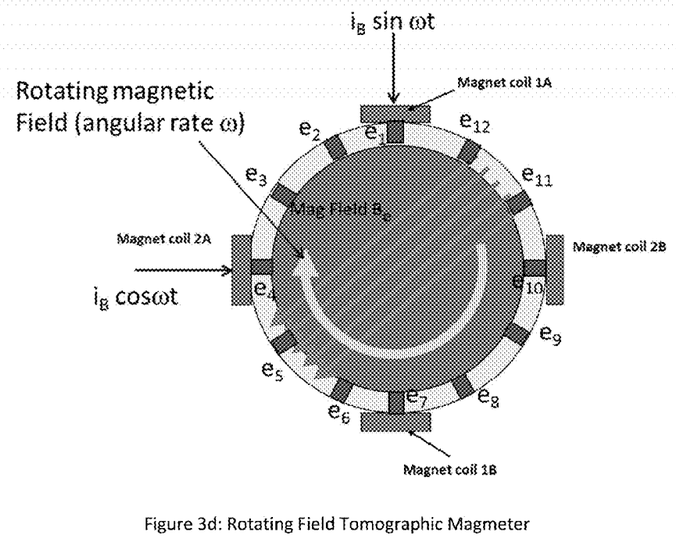
FIG. 3d shows a process flow pipe having a multi-axis magmeter arranged thereon with having two pairs of diametrically opposed magnet coils, consistent with that shown in FIGS. 3a, 3b and 3c, for responding to an application of quadrature drive currents ($i_h \sin(\omega t)$, $i_h \cos(\omega t)$), and providing a rotating magnetic field $B_e$ (where $B_e=B_v+B_h$) with an angular rate of $\omega$, and multiple pairs of diametrically opposed electrodes for responding to the rotating magnetic field $B_e$, and providing signaling containing information about the same, according to some embodiments of the present invention.

FIG. 3d: Multi-Coil Magmeter

By way of example, FIG. 3d shows an implementation of an embodiment for sensing a rotating magnetic field in a multi-axis magmeter, according to some embodiments of the present invention.

For example, FIG. 3d shows a process flow pipe having a multi-axis magmeter arranged thereon with two pairs of diametrically opposed magnet coils labeled 1A, 1B, 2A and 2B, consistent with that shown in FIGS. 3a, 3b and 3c, for responding to the application of quadrature drive currents (e.g., $i_b \sin(\omega t)$, $i_b \cos(\omega t)$), and providing the rotating magnetic field $B_e$ (e.g. where $B_e = B_v + B_h$) with an angular rate of $\omega$, as well as multiple pairs of diametrically opposed electrodes (e.g., $e_1, e_2, e_3, \ldots, e_{12}$) for responding to the rotating magnetic field $B_e$, and providing signaling containing information about the same, according to some embodiments of the present invention.

In operation, the application of quadrature drive currents (e.g., using sine and cosine functionality) to the orthogonal coil pairs labeled 1A, 1B, 2A and 2B allows for the generation of the rotating magnetic field $B_e$ of substantially constant strength and rotational speed $\omega$. Combining the rotating field with the multi-electrode concept produces a device that provides for a detailed flow profile analysis. The rotating magnetic field produces electric potentials across pairs of electrodes (e.g., the 12 electrode examples shown), and each electrode pair "samples" the flow rate for a particular "plane" in the flow stream.

FIGS. 4a to 4d

Figure 4A:
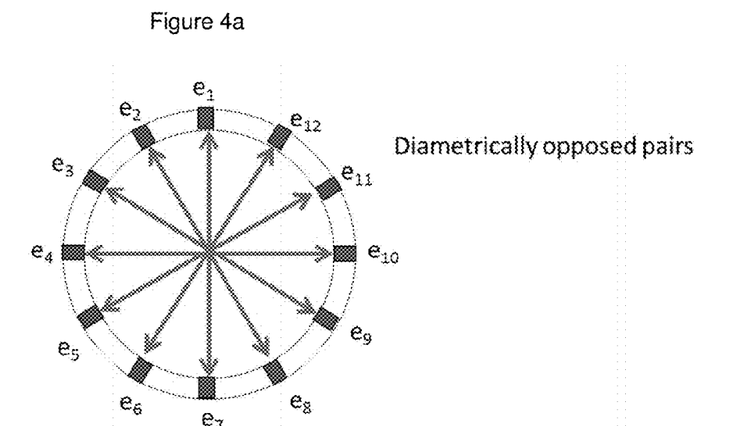
FIG. 4a shows a process flow pipe having multiple pairs of electrodes ($e_1$, $e_2$, $e_3$, . . . , $e_{12}$) arranged thereon and configured for sensing in diametrically opposed planes (e.g., $e_1$-$e_7$; $e_2$-$e_8$; $e_3$-$e_9$; $e_4$-$e_{10}$; $e_5$-$e_{11}$; $e_6$-$e_{12}$), that may form part of some embodiments of the present invention.

FIG. 4a shows a process flow pipe having multiple pairs of electrodes (e.g., $e_1, e_2, e_3, \ldots, e_{12}$) arranged thereon and configured for sensing in diametrically opposed planes (e.g., $e_1$-$e_7$; $e_2$-$e_8$; $e_3$-$e_9$; $e_4$-$e_{10}$; $e_5$-$e_{11}$; $e_6$-$e_{12}$), that may form part of some embodiments of the present invention.

Figure 4B:
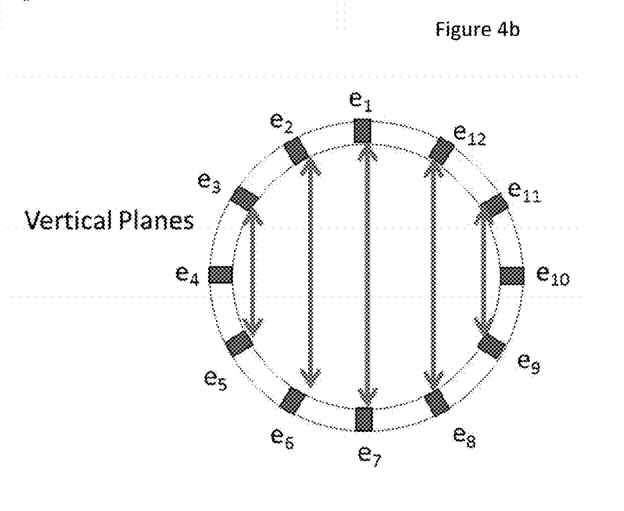
FIG. 4b shows a process flow pipe having multiple pairs of electrodes (e.g., $e_1$, $e_2$, $e_3$, . . . , $e_{12}$) arranged thereon and configured for sensing in vertical planes (e.g., $e_1$-$e_7$; $e_2$-$e_6$; $e_3$-$e_5$; $e_8$-$e_{12}$; $e_9$-$e_{11}$), that may form part of some embodiments of the present invention.

FIG. 4b shows a process flow pipe having multiple pairs of electrodes (e.g., $e_1, e_2, e_3, \ldots, e_{12}$) arranged thereon and configured for sensing in vertical planes (e.g., $e_1$-$e_7$; $e_2$-$e_6$; $e_3$-$e_5$; $e_8$-$e_{12}$; $e_9$-$e_{11}$), that may form part of some embodiments of the present invention.

Figure 4C:
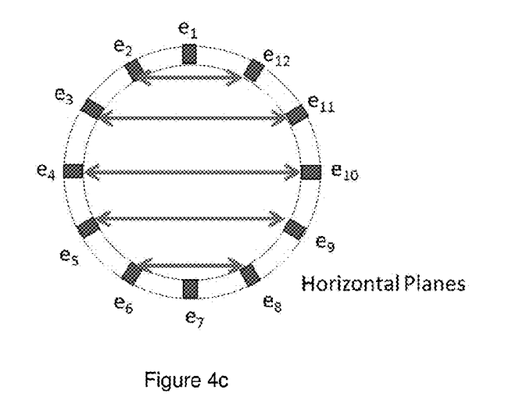
FIG. 4c shows a process flow pipe having multiple pairs of diametrically opposed electrodes (e.g., $e_1$, $e_2$, $e_3$, . . . , $e_{12}$) arranged thereon and configured for sensing in horizontal planes (e.g., $e_2$-$e_{12}$; $e_3$-$e_{11}$; $e_4$-$e_{10}$; $e_5$-$e_9$; $e_6$-$e_8$), that may form part of some embodiments of the present invention.

FIG. 4c shows a process flow pipe having multiple pairs of diametrically opposed electrodes (e.g., $e_1, e_2, e_3, \ldots, e_{12}$) arranged thereon and configured for sensing in horizontal planes (e.g., $e_2$-$e_{12}$; $e_3$-$e_{11}$; $e_4$-$e_{10}$; $e_5$-$e_9$; $e_6$-$e_8$), that may form part of some embodiments of the present invention.

Figure 4D:
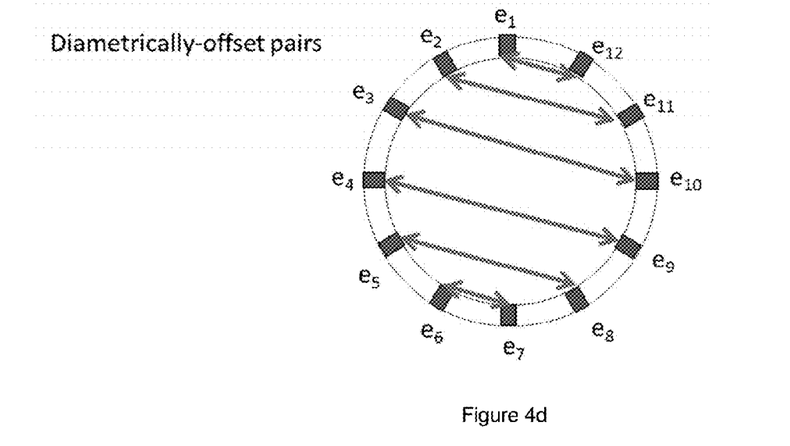
FIG. 4d shows a process flow pipe having multiple pairs of diametrically opposed electrodes (e.g., $e_1$, $e_2$, $e_3$, . . . , $e_{12}$) arranged thereon and configured for sensing in diametrically-offset planes (e.g., $e_1$-$e_{12}$; $e_2$-$e_{11}$; $e_3$-$e_{10}$; $e_4$-$e_9$; $e_5$-$e_8$; $e_6$-$e_7$), that may form part of some embodiments of the present invention.

FIG. 4d shows a process flow pipe having multiple pairs of diametrically opposed electrodes (e.g., $e_1, e_2, e_3, \ldots, e_{12}$) arranged thereon and configured for sensing in diametrically-offset planes (e.g., $e_1$-$e_{12}$; $e_2$-$e_{11}$; $e_3$-$e_{10}$; $e_4$-$e_9$; $e_5$-$e_8$; $e_6$-$e_7$), that may form part of some embodiments of the present invention.

Signal Processor or Signal Processing Module 10a

By way of example, and consistent with that described herein, the functionality of the signal processor or processing module 10a may be implemented to receive the signaling, process the signaling, and/or provide the corresponding signaling, using hardware, software, firmware, or a combination thereof, although the scope of the invention is not intended to be limited to any particular embodiment thereof. In a typical software implementation, the signal processor or processing module 10a may include, or take the form of, one or more microprocessor-based architectures having a microprocessor, a random access memory (RAM), a read only memory (ROM), input/output devices and control, data and address busing architecture connecting the same. A person skilled in the art would be able to program such a microprocessor-based implementation to perform the functionality set forth herein, as well as other functionality described herein without undue experimentation. The scope of the invention is not intended to be limited to any particular implementation using technology either now known or later developed in the future. Moreover, the scope of the invention is intended to include a signal processor, device or module 10a as either part of the aforementioned apparatus, as a stand alone module, or in the combination with other circuitry for implementing another module.

Techniques for receiving signaling in such a signal processor or processing module 10a are known in the art, and the scope of the invention is not intended to be limited to any particular type or kind thereof either now known or later developed in the future. Based on this understanding, a person skilled in the art would appreciate, understand and be able to implement and/or adapt the signal processor or processing module 10a without undue experimentation, e.g., so as to receive signaling containing information about an application of a rotating magnetic field across a fluid flowing in a pipe, tank, cell or vessel, consistent with that set forth herein.

Techniques, including techniques based on tomography or tomographic processing techniques, for determining information based on analyzing or processing signaling received in such a signal processor or processing module 10a are also known in the art, and the scope of the invention is not intended to be limited to any particular type or kind thereof either now known or later developed in the future. Based on this understanding, a person skilled in the art would appreciate, understand and be able to implement and/or adapt the signal processor or processing module 10a without undue experimentation to determine a flow analysis across the fluid flowing in the pipe, tank, cell or vessel, based at least partly on the signaling received, e.g., using a tomographic processing technique, consistent with that set forth herein.

It is also understood that the apparatus 10 may include one or more other modules, components, processing circuits, or circuitry 10b for implementing other functionality associated with the underlying apparatus that do not form part of the underlying invention, and thus is not described in detail herein. By way of example, the one or more other modules, components, processing circuits, or circuitry may include random access memory, read only memory, input/output circuitry and data and address buses for use in relation to implementing the signal processing functionality of the signal processor, or devices or components, etc.

Tomography or Tomographic Processing Techniques

Tomography or tomographic processing techniques, e.g., including modulated magnetic-electrical impedance tomography, are known in the art, and generally understood to refer to imaging by sections or sectioning, through the use of some kind of penetrating wave. A device used in tomography is called a tomograph, while the image produced is a tomogram. Such methods or techniques may be used, e.g., in radiology, archeology, biology, geophysics, oceanography, materials science, astrophysics, quantum information and other sciences. In most cases, such methods or techniques may be based on the mathematical procedure called tomographic reconstruction. Tomographic reconstruction algorithms are known in the art for determining the imaging by sections or sectioning, through the use of any kind of penetrating wave. By way of example, the reader is referred to U.S. Pat. Nos. 6,078,397; 5,181,778; 4,386,854; and 4,328,707, which all relate to tomographic techniques and are all incorporated by reference in their entirety. The scope of the invention is not intended to be limited to the type or kind of tomographic reconstruction algorithms, e.g., including those based at least partly on using ultrasonic waves, either now known or later developed in the future.

By way of example, see also the aforementioned PCT applications referred to and incorporated by reference herein, including PCT application no. PCT/US12/52074, filed 23 Aug. 2012, as well as PCT application no. PCT/US12/60811, filed 18 Oct. 2012, which disclose applications based at least partly on using a tomography or tomographic processing technique, which were developed and is owned by the assignee of the instant patent application, and which are hereby incorporated by reference in their entirety.

Moreover, embodiments are envisioned, and the scope of the invention is intended to include, using other types or kinds of tomography or tomographic processing technique either now known or later developed in the future. Finally, the scope of the invention is not intended to be limited to any particular type or kind of tomography or tomographic processing technique either now known or later developed in the future.

A person skilled in the art without undue experimentation would be able to adapt one or more of the aforementioned tomography or tomographic processing technique in order to implement the present invention, including to configure a signal processing module at least to receive signaling containing information about an application of a rotating magnetic field across a fluid flowing in a pipe, tank, cell or vessel; and determine a flow analysis across the fluid flowing in the pipe, tank, cell or vessel, based at least partly on the signaling received.

Magnetic Coils and Electrodes

Magnetic coils and electrodes like those shown in the drawing of the present application herein are known in the art, and the scope of the invention is not intended to be limited to any particular type or kind thereof either now known or later developed in the future.

Moreover, techniques for coupling or arranging such magnetic coils and electrodes, e.g., to, or in relation to, a pipe, tank, cell or container are known in the art, and the scope of the invention is not intended to be limited to any particular manner of way of so coupling or arranging the same, e.g., including manners and ways either now known or later developed in the future.

Applications

By way of example, the present invention may be used in, or form part of, or used in conjunction with, industrial processes like a mineral extraction processing system for extracting or separating minerals in a fluidic medium that are either now known or later developed in the future, including any mineral process, such as those related to processing substances or compounds that result from inorganic processes of nature and/or that are mined from the ground, as well as including either other extraction processing systems or other industrial processes, where the extraction, or separating, or sorting, or classification, of product by size, or density, or some electrical characteristic, is critical to overall industrial process performance.

THE SCOPE OF THE INVENTION

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. Apparatus comprising:
   orthogonal magnetic coil pairs arranged in relation to a pipe, tank, cell or vessel, and configured to generate a rotating magnetic field across a fluid flowing in the pipe, tank, cell or vessel so as to allow an effective magnetic vector to be steered or swept across the fluid;
   electrode pairs configured to respond to the rotating magnetic field and provide signaling containing information about the rotating magnetic field across the fluid; and
   a signal processing module configured at least to:
      receive the signaling, and
      determine corresponding signaling containing information about a flow analysis across the fluid flowing in the pipe, tank, cell or vessel using one or more tomographic processing algorithms, based at least partly on the signaling received.

2. Apparatus according to claim 1, wherein the signal processing module is configured to provide the corresponding signaling containing information about the flow analysis across the fluid flowing in the pipe, tank, cell or vessel.

3. Apparatus according to claim 1, wherein the orthogonal magnetic coil pairs respond to quadrature drive currents that allow for the generation of the rotating magnetic field.

4. Apparatus according to claim 1, wherein the rotating magnetic field has a substantially constant strength and rotational speed ($\omega$).

5. Apparatus according to claim 1, wherein the signal processing module is configured to receive the signaling from multiple electrode pairs configured in relation to the pipe, tank, cell or vessel.

6. Apparatus according to claim 5, wherein the rotating magnetic field produces electrical potential across the multiple electrode pairs.

7. Apparatus according to claim 5, wherein each electrode pair samples a rate of the fluid flowing in the pipe, tank, cell or vessel for a respective plane.

8. Apparatus according to claim 5, wherein the multiple electrode pairs include corresponding electrode pairs that are diametrically opposed, or that are in vertical planes, or that are in horizontal planes, or that are diametrically offset, so as to allow the fluid flowing in the pipe, tank, cell or vessel to be measured in different planes.

9. Apparatus according to claim 8, wherein the flow analysis determined includes either a segment of the fluid flowing in the pipe, or a flow profiling across the fluid flowing in the pipe, tank, cell or vessel.

10. Apparatus according to claim 1, wherein
    the effective magnetic vector is steered or swept continuously; and
    the signal processing module is configured to receive the signaling from multiple electrode pairs configured in relation to the pipe, tank, cell or vessel so as to allow profiling of the fluid flowing in the pipe, tank, cell or vessel in multiple orientations.

11. Apparatus according to claim 10, wherein the signal processing module is configured to determine the flow analysis based at least partly on using a deconvolution of data received in the signaling using the one or more tomographic processing algorithms, including modulated magnetic-electrical impedance tomography, and determine a detailed analysis of a flow profile in full X-Y planes.

12. Apparatus according to claim 1, wherein the rotating magnetic field produces electrical potential across every pair of multiple electrode pairs.

13. Apparatus according to claim 1, wherein each electrode pair is configured to sample a rate of the fluid flowing in the pipe, tank, cell or vessel for a respective plane.

14. Apparatus according to claim 1, wherein the electrode pairs comprise corresponding electrode pairs that are diametrically opposed, or that are in vertical planes, or that are in horizontal planes, or that are diametrically offset, so as to allow the fluid flowing in the pipe, tank, cell or vessel to be measured in different planes.

15. Apparatus according to claim 14, wherein the flow analysis determined includes either a segment of the fluid flowing in the pipe, tank, cell or vessel or a flow profiling across the fluid flowing in the pipe, tank, cell or vessel.

16. Apparatus according to claim 1, wherein
    the signal processing module is configured to respond to the signaling received, and provide in the flow analysis information about profiling of the fluid flowing in the pipe, tank, cell or vessel in multiple orientations.

17. Apparatus according to claim 16, wherein the signal processing module is configured to determine the flow analysis based at least partly on using a deconvolution of data received in the signaling using one or more tomographic processing algorithms, including a modulated magnetic-electrical impedance tomography, and determine a detailed analysis of a flow profile in full X-Y planes.

18. Apparatus according to claim 16, wherein the signal processing module is configured with at least one processor and at least one memory including computer program code, the at least one memory and computer program code configured, with the at least one processor.

19. Apparatus according to claim 16, wherein the signal processing module is configured to determine the flow analysis across the fluid flowing in the pipe, tank, cell or vessel, based at least partly on using tomography, including using a method of producing a three-dimensional image of the fluid flowing in the pipe by sensing and recording differences in the effects on the passage of waves of energy impinging on the fluid flowing in the pipe.

20. A method comprising:
arranging orthogonal magnetic coil pairs in relation to a pipe, tank, cell or vessel;
generating with the orthogonal magnetic coil pairs a rotating magnetic field across a fluid flowing in the pipe, tank, cell or vessel so as to allow an effective magnetic vector to be steered or swept across the fluid;
responding with electrode pairs to the rotating magnetic field and providing signaling containing information about the rotating magnetic field across the fluid;
receiving in a signal processing module the signaling; and
determining in the signal processing module corresponding signaling containing information about a flow analysis across the fluid flowing in the pipe, tank, cell or vessel using one or more tomographic processing algorithms, based at least partly on the signaling received.

21. A method according to claim 20, wherein the method comprises providing the corresponding signaling containing information about the flow analysis across the fluid flowing in the pipe, tank, cell or vessel.

22. A method according to claim 20, wherein the method comprises providing quadrature drive currents to the orthogonal magnetic coil pairs that allow for the generation of the rotating magnetic field.

23. A method according to claim 20, wherein the rotating magnetic field has a substantially constant strength and rotational speed ($\omega$).

24. A method according to claim 20, wherein the method comprises receiving with the signal processing module the signaling from multiple electrode pairs configured in relation to the pipe, tank, cell or vessel.

25. A method according to claim 24, wherein the rotating magnetic field produces electrical potential across every pair of the multiple electrode pairs.

26. A method according to claim 24, wherein the method comprises sampling with each electrode pair a rate of the fluid flowing in the pipe, tank, cell or vessel for a respective plane.

27. A method according to claim 24, wherein the multiple electrode pairs include corresponding electrode pairs that are diametrically opposed, or that are in vertical planes, or that are in horizontal planes, or that are diametrically offset, so as to allow the fluid flowing in the pipe to be measured in different planes.

28. A method according to claim 27, wherein the flow analysis determined includes either a segment of the fluid flowing in the pipe, or a flow profiling across the fluid flowing in the pipe.

29. A method according to claim 20, wherein the method comprises
steering or sweeping effective magnetic vector continuously; and
responding with the signal processing module to the signaling and profiling the fluid flowing in the pipe, tank, cell or vessel in multiple orientations.

30. A method according to claim 29, wherein the method comprises configuring the signal processing module to determine the flow analysis based at least partly on using a deconvolution of data received in the signaling using one or more tomographic processing algorithms, including a modulated magnetic-electrical impedance tomography, and determine a detailed analysis of a flow profile in full X-Y planes.

31. Apparatus comprising:
means arranged in relation to a pipe, tank, cell or vessel for generating a rotating magnetic field across a fluid flowing in the pipe, tank, cell or vessel so as to allow an effective magnetic vector to be steered or swept across the fluid, and for providing signaling containing information about the rotating magnetic field across the fluid; and
means for responding to the rotating magnetic field and providing signaling containing information about the rotating magnetic field across the fluid;
a signal processing module configured at least with:
means for receiving the signaling, and
means for determining corresponding signaling containing information about a flow analysis across the fluid flowing in the pipe, tank, cell or vessel using one or more tomographic processing algorithms, based at least partly on the signaling received.

32. Apparatus according to claim 31, wherein the signal processing module is configured at least with means for providing the corresponding signaling containing information about the flow analysis across the fluid flowing in the pipe.

* * * * *